Nov. 17, 1959  D. STOLZ  2,913,567
WELDING MACHINE AND METHOD
Filed Jan. 7, 1958  13 Sheets-Sheet 1
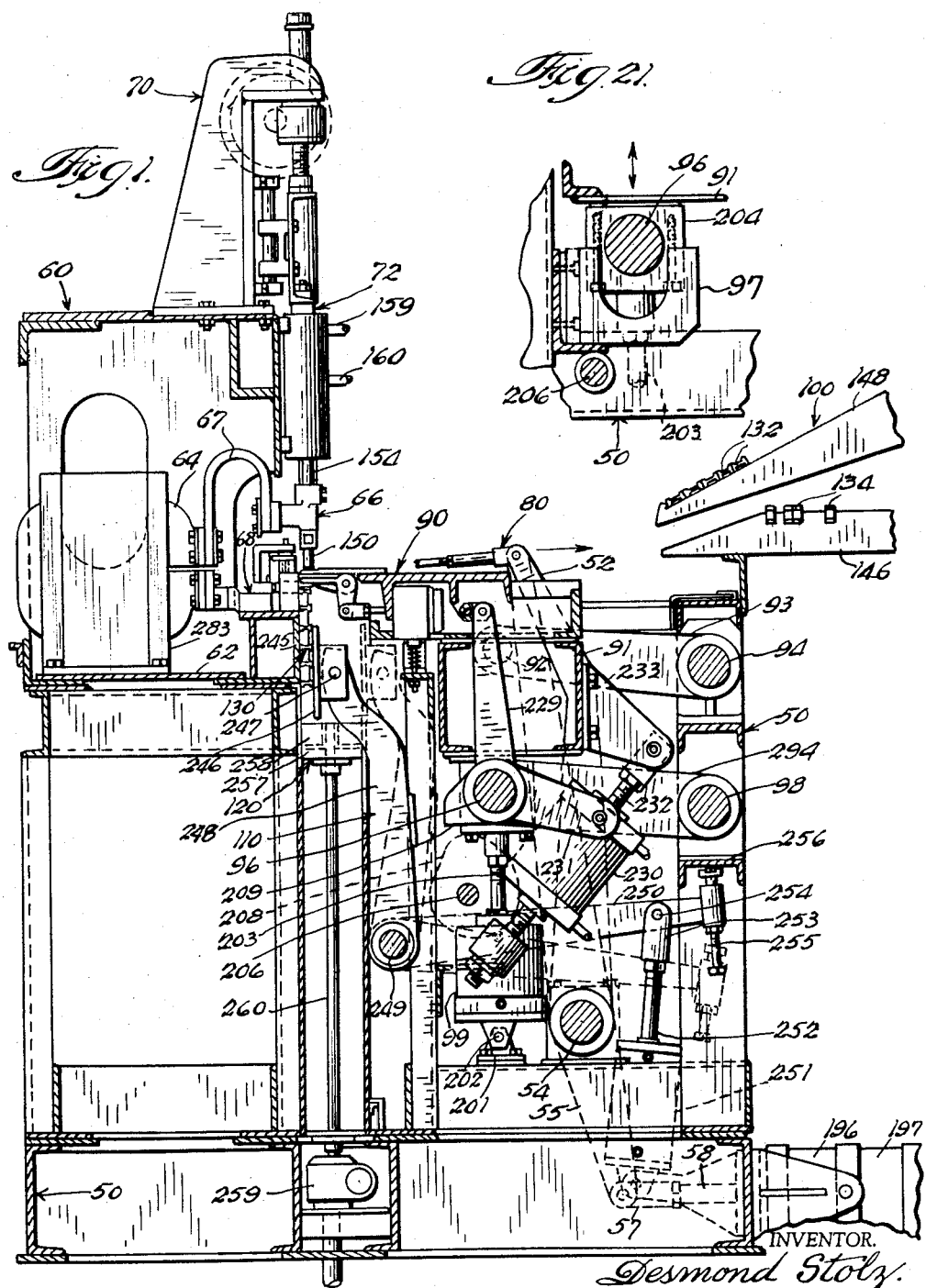
INVENTOR.
Desmond Stolz.
BY
Olson, Mecklenburger, von Holst,
Pendleton & Neuman. Attys.

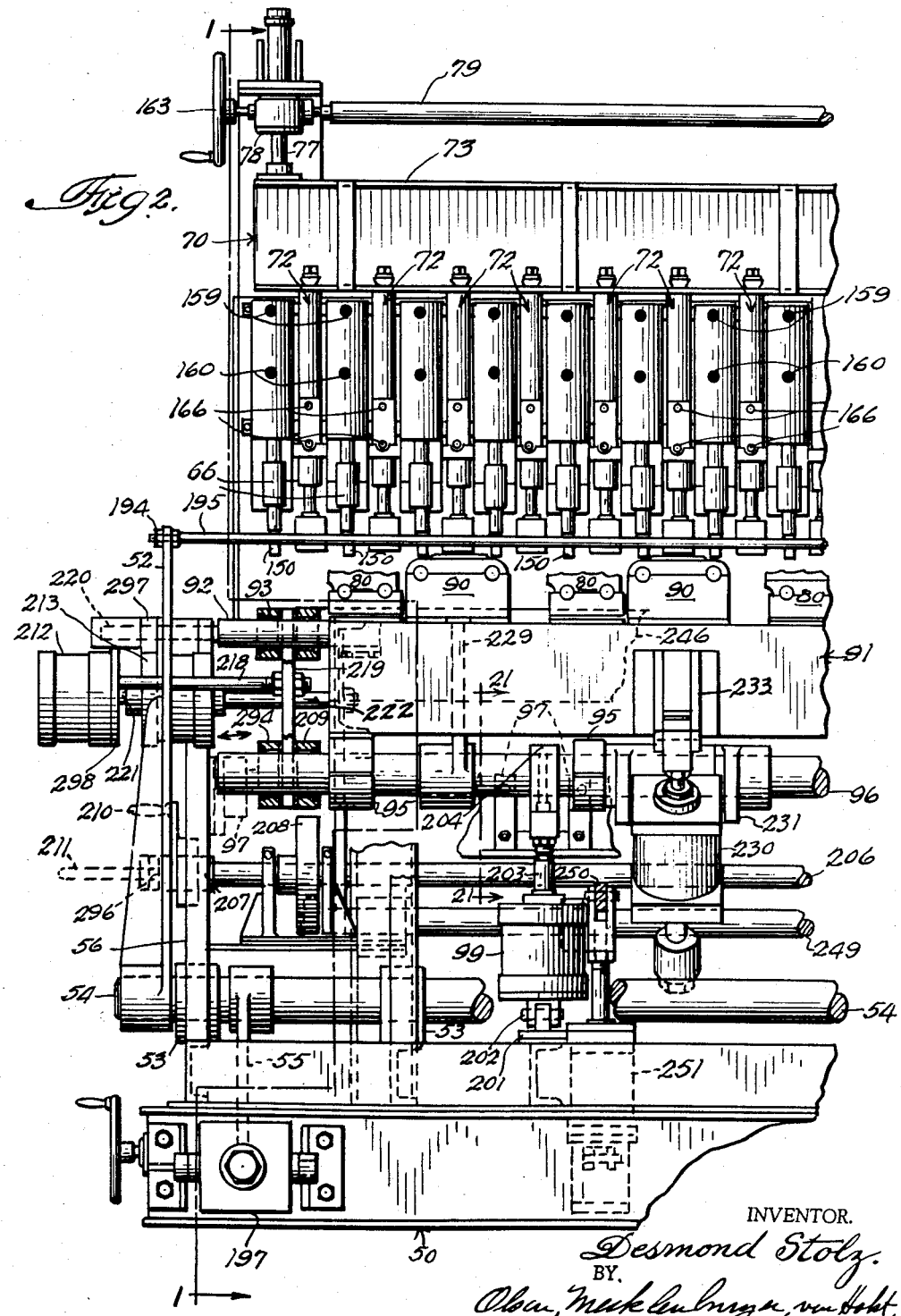

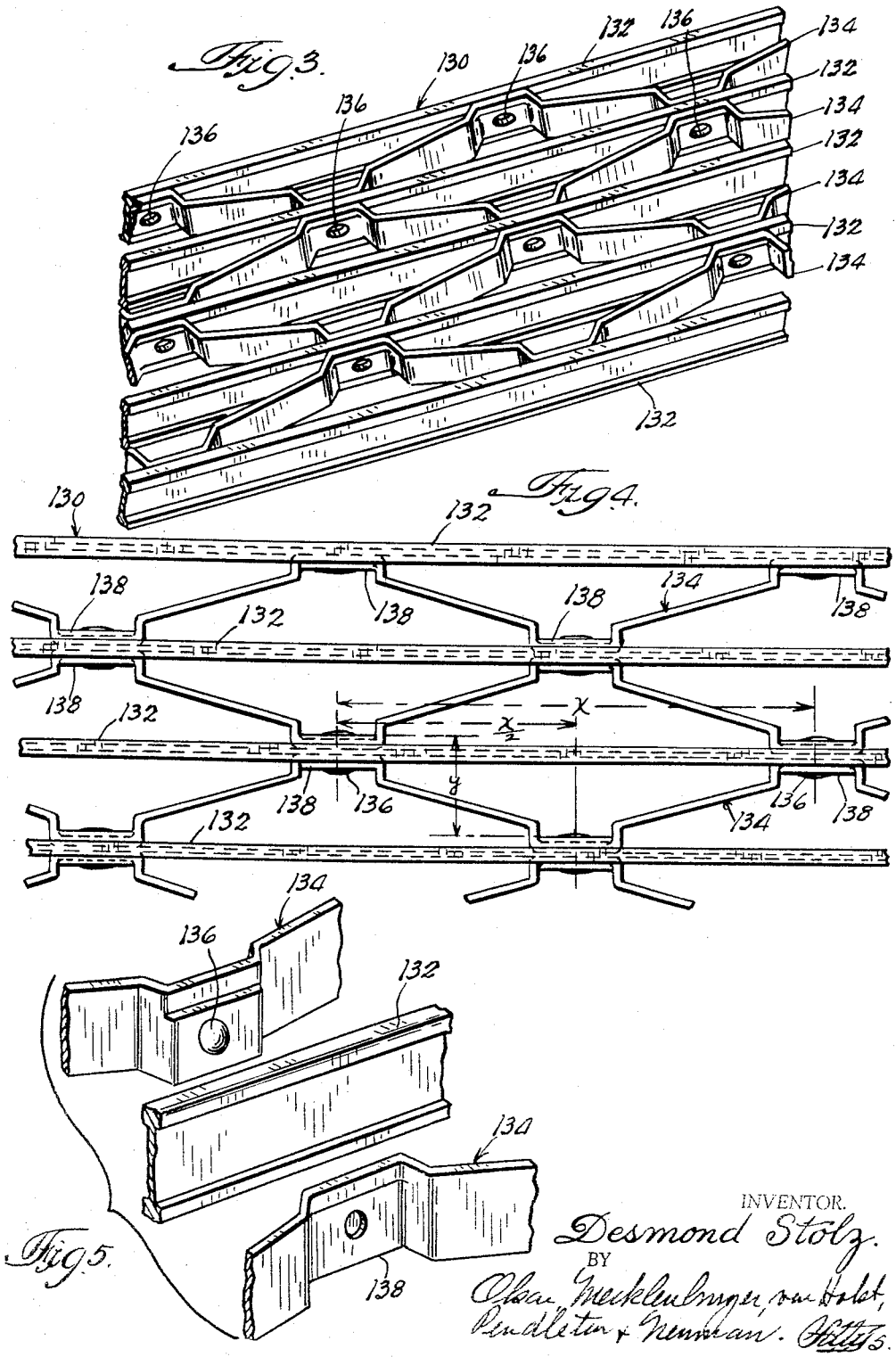

Nov. 17, 1959  D. STOLZ  2,913,567
WELDING MACHINE AND METHOD
Filed Jan. 7, 1958  13 Sheets-Sheet 4
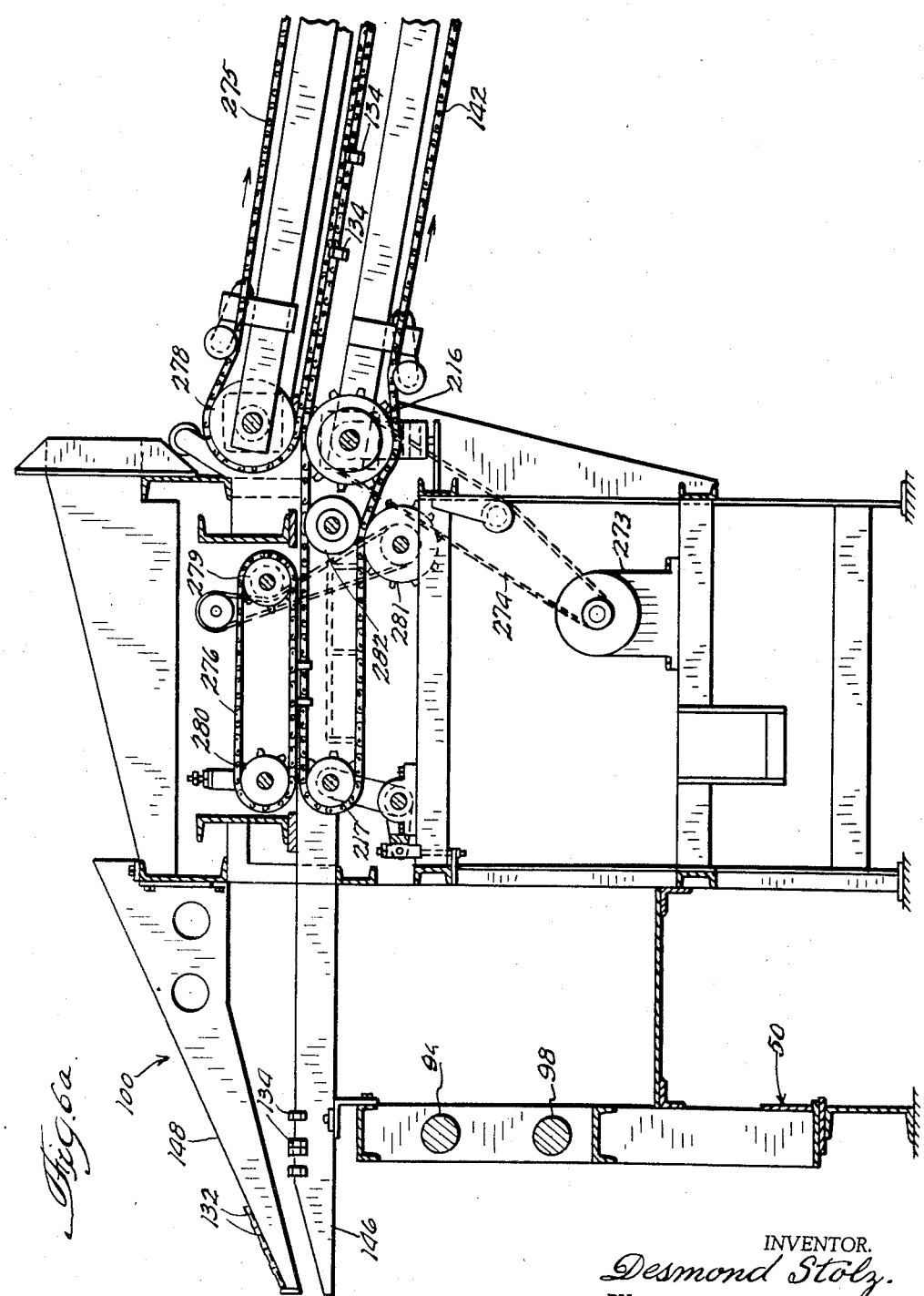
INVENTOR.
Desmond Stolz.
BY.
Olsen, Mecklenburger, von Holst,
Pendleton & Neuman. Attys.

Nov. 17, 1959          D. STOLZ          2,913,567
WELDING MACHINE AND METHOD
Filed Jan. 7, 1958          13 Sheets-Sheet 5
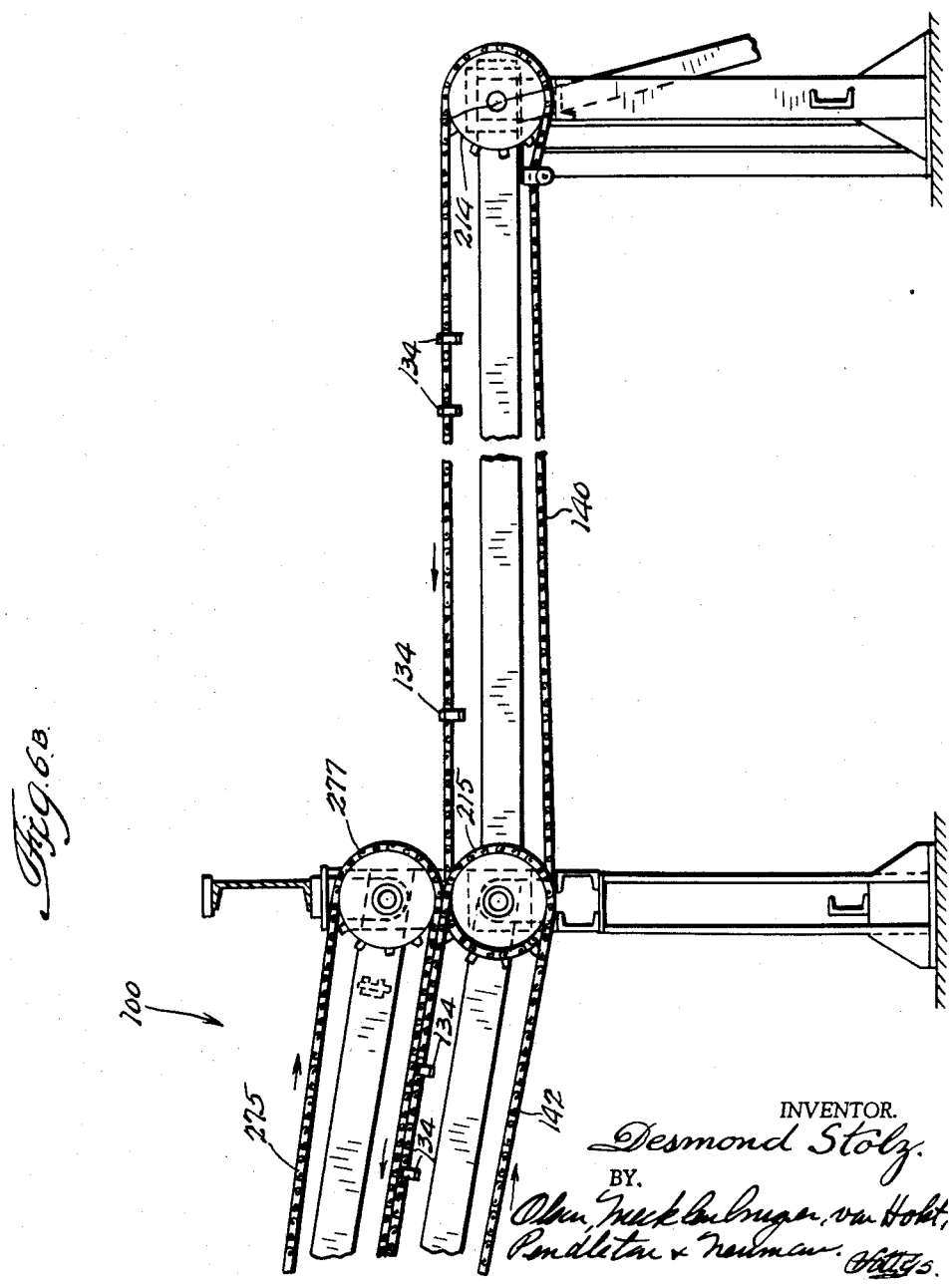

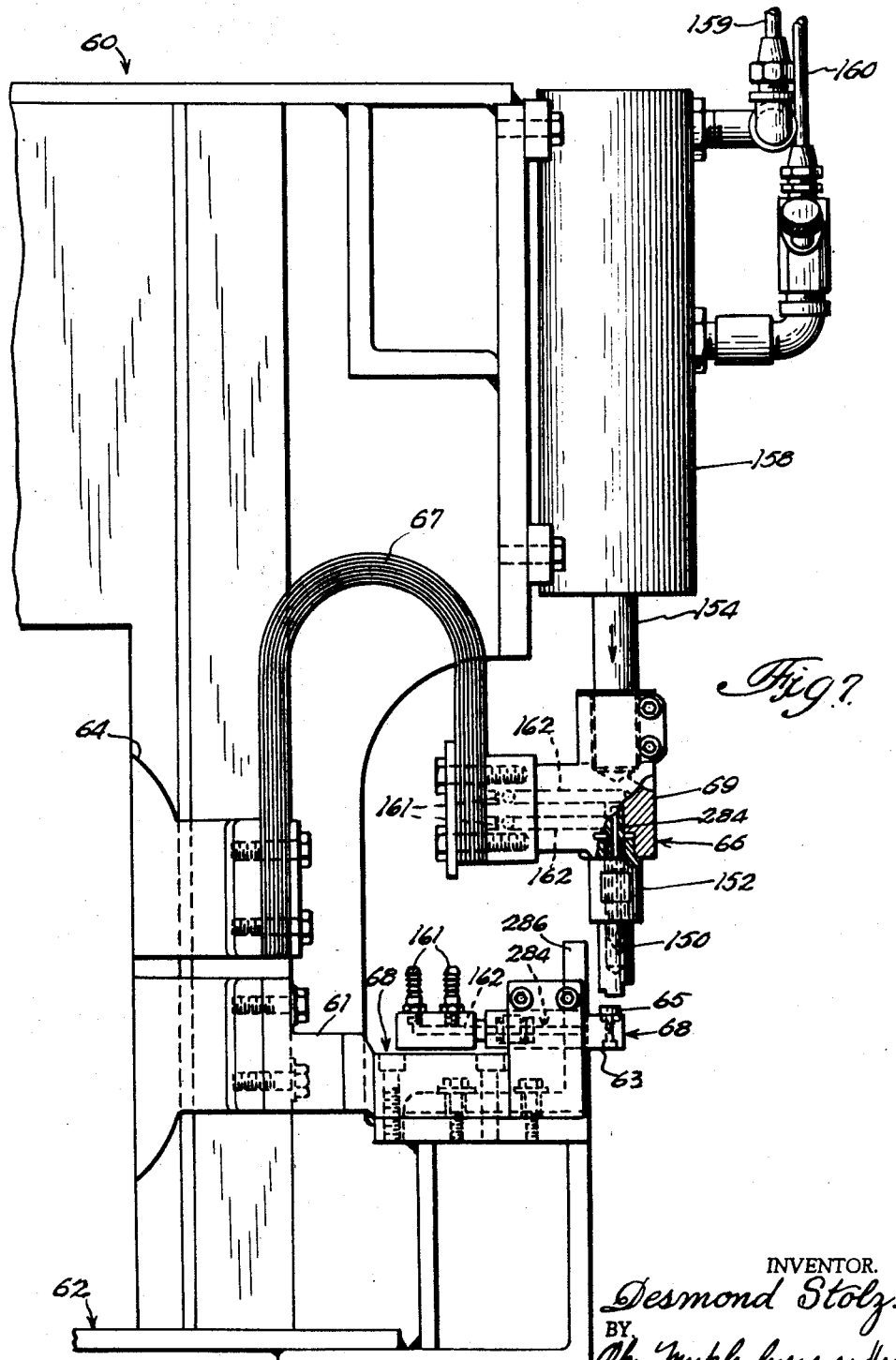

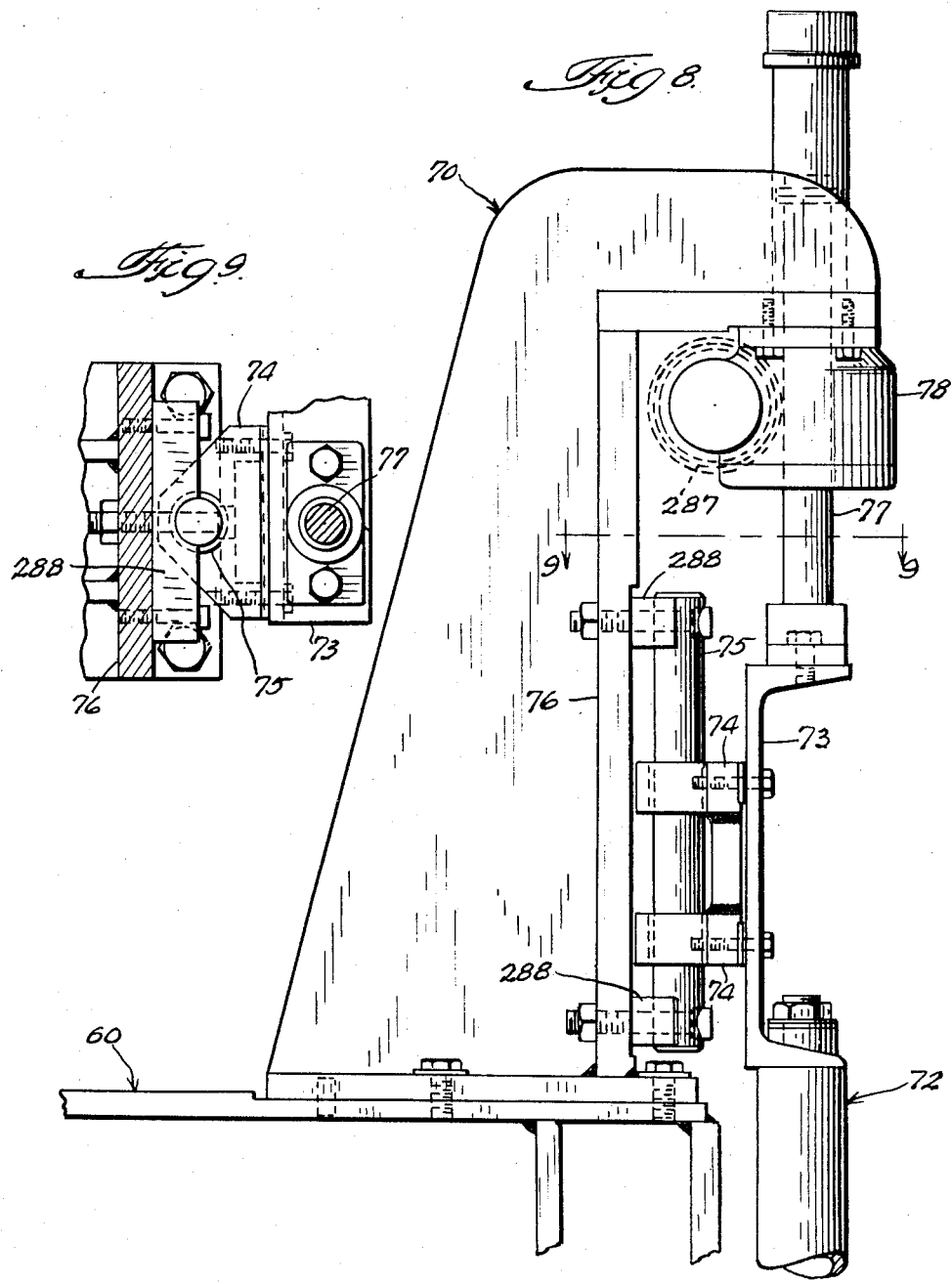

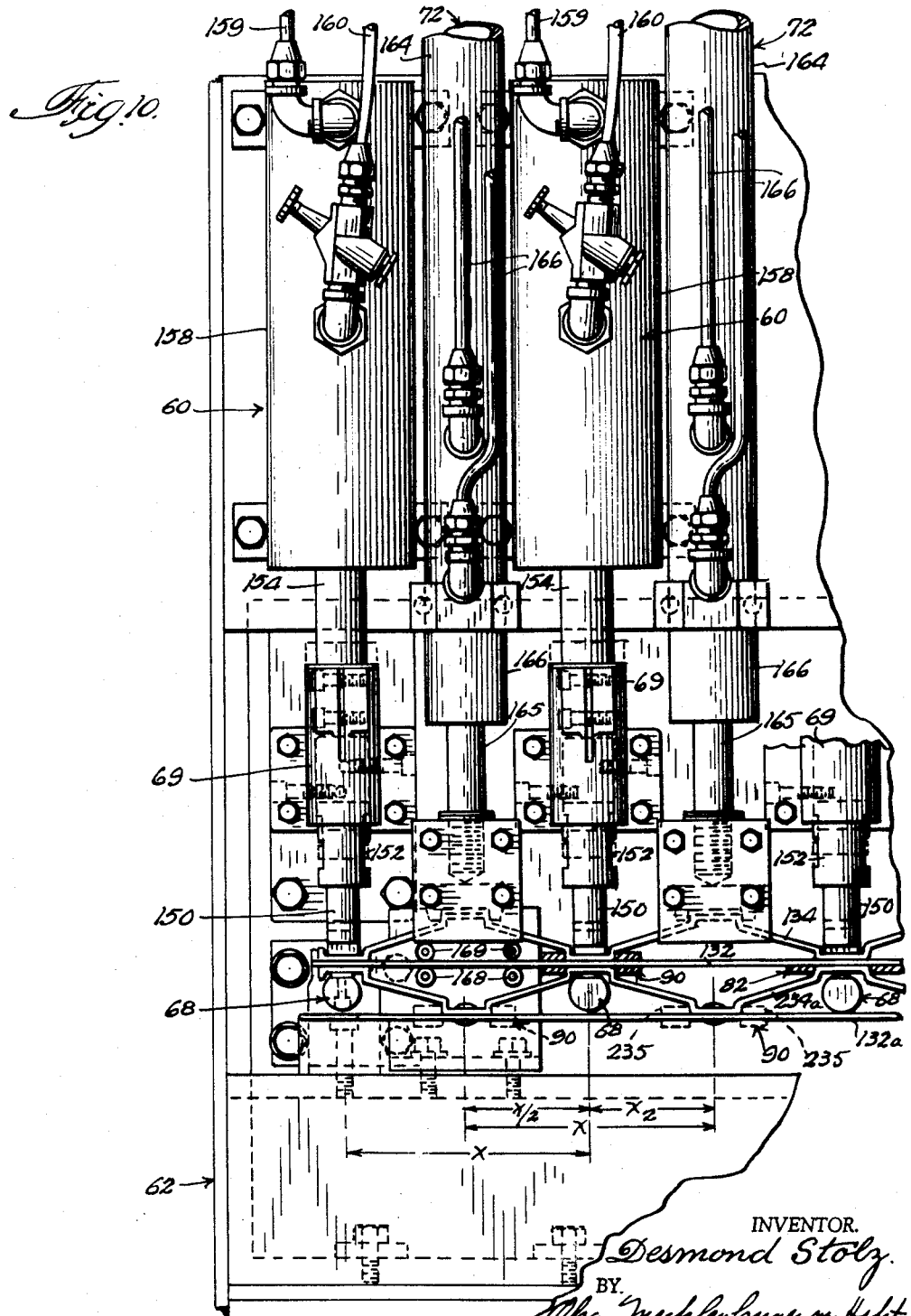

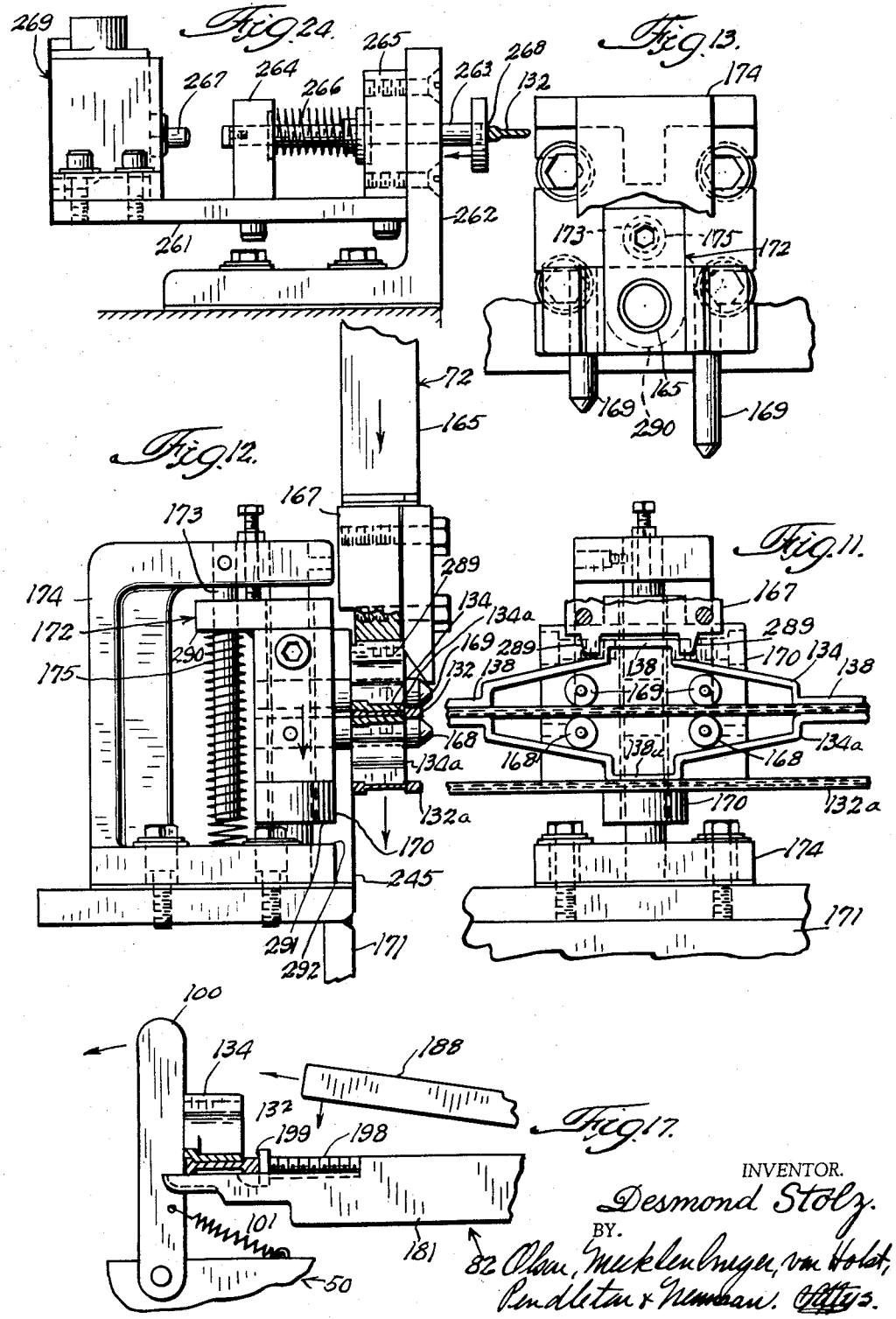

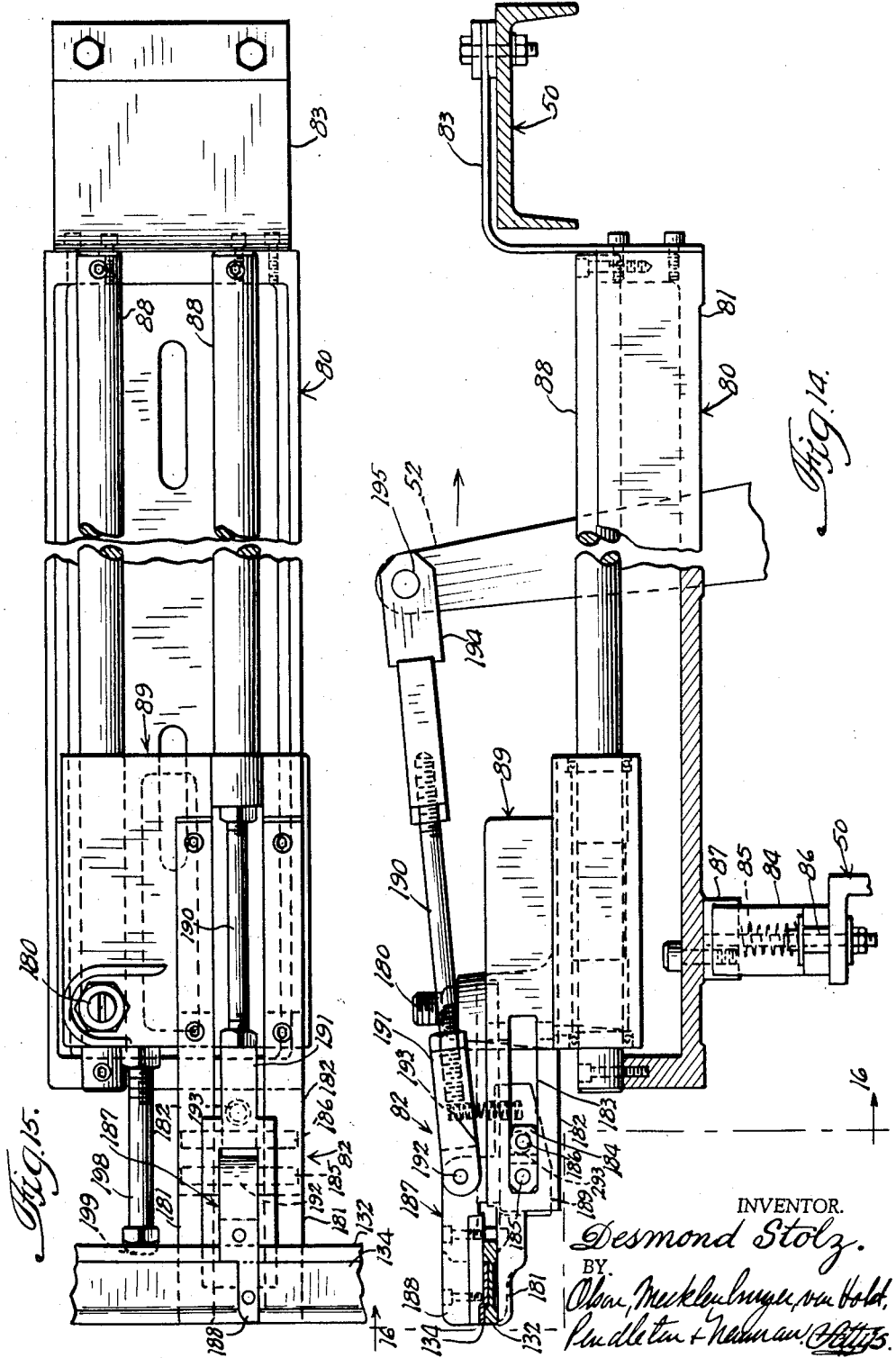

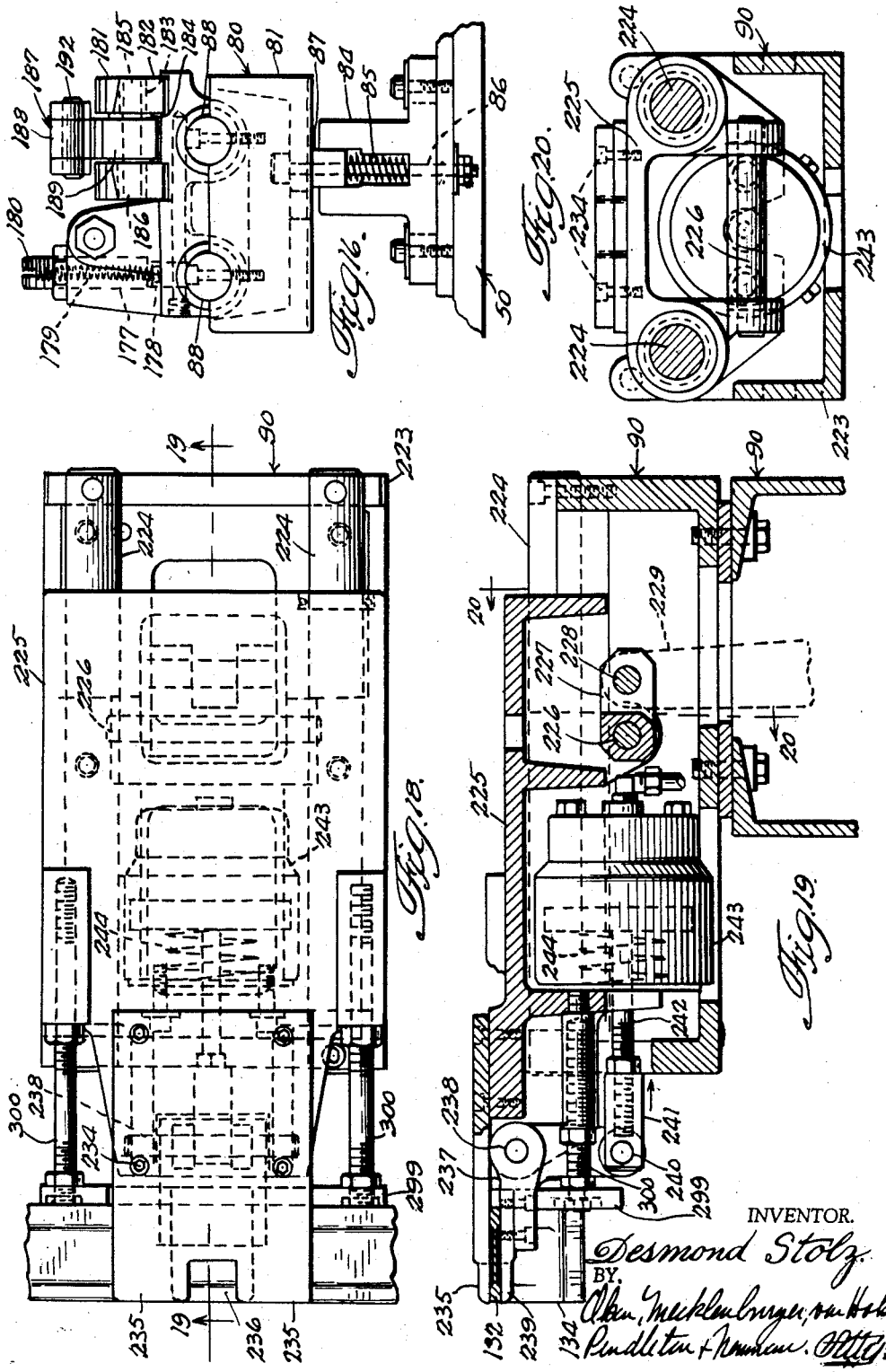

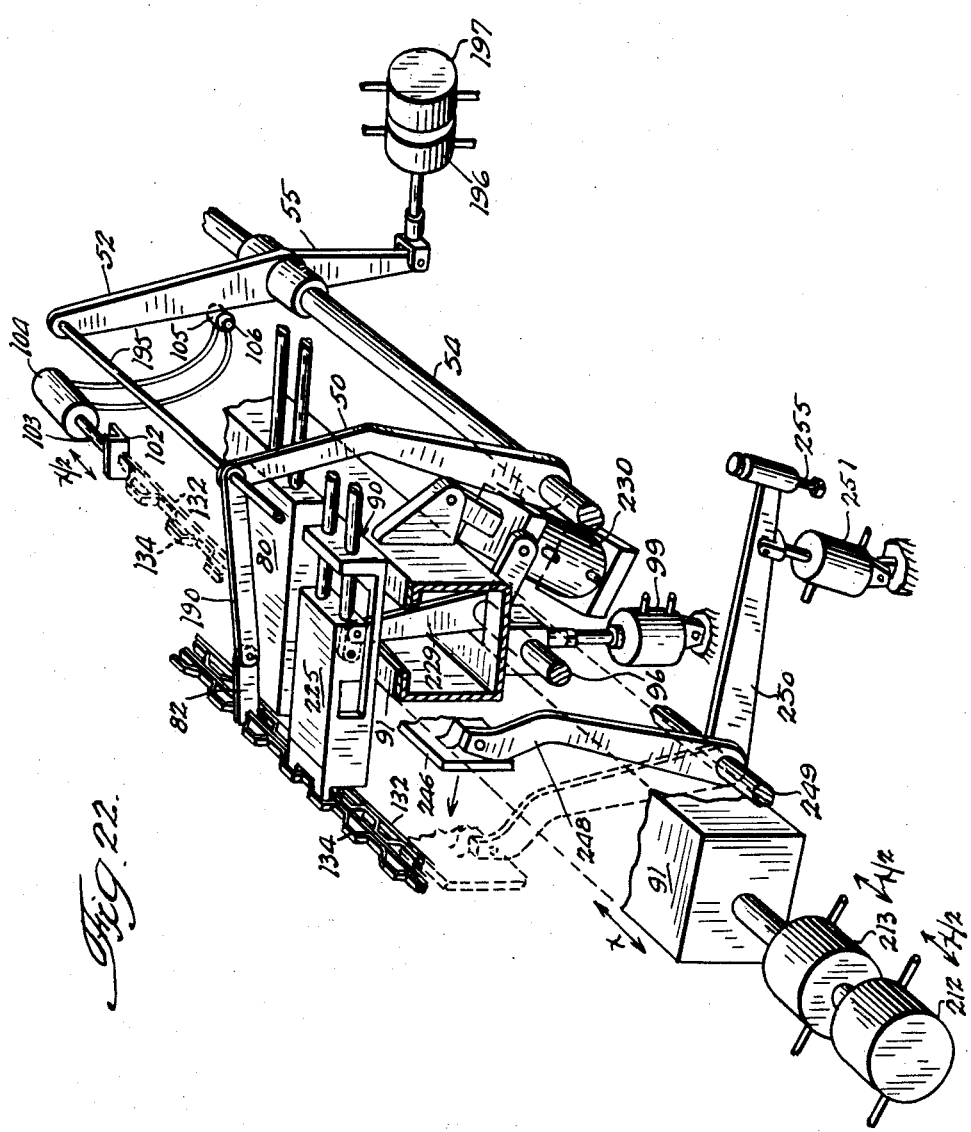

Nov. 17, 1959   D. STOLZ   2,913,567
WELDING MACHINE AND METHOD
Filed Jan. 7, 1958   13 Sheets-Sheet 13

INVENTOR.
Desmond Stolz.
BY
Olson, Mecklenburger, van Holst,
Pendleton & Neuman.

United States Patent Office 2,913,567
Patented Nov. 17, 1959

2,913,567

WELDING MACHINE AND METHOD

Desmond Stolz, Milwaukee, Wis.

Application January 7, 1958, Serial No. 707,537

30 Claims. (Cl. 219—79)

This invention relates to a method and machine for welding heavy-duty grating structures.

More particularly this invention relates to a method and machine for welding grating structures of the type having a plurality of longitudinally extending primary bars spaced apart by interconnecting secondary bars which abut adjacent primary bars at welded contact portions.

In the manufacture of heavy-duty grating structures it has been found desirable to fabricate said structures by welding together a plurality of primary and secondary load bars to form a rigid continuous structure. The primary bars so employed are elongated and may be I-shaped in cross section, and are arranged and maintained in fixed, spaced relationship by generally zigzag-shaped secondary bars which are positioned longitudinally between and alternately contact adjacent primary bars at spaced-apart weldable contact portions. Heretofore, however, it has been found difficult and time-consuming by present equipment and methods to weld such structures because of the alignment problem inherent in the pattern thereof. Consequently, it is another object of this invention to provide an improved method and machine for welding grating structures of this type.

It is another object of this invention to provide an improved method and machine for welding grating structures of any desired length, width or thickness.

It is still another object of this invention to provide an improved method and machine for welding a substantially continuously fed supply of bars into a grating structure.

It is a still further object of this invention to provide an improved method and machine for automatically aligning and realigning welded and unwelded bars in the process of forming a complete welded grating structure.

It is a still further object of this invention to provide an improved welding machine which will be sturdy in construction, reasonable in cost of manufacture, and efficient, economical, reliable and safe in operation.

This invention, together with further objects and advantages thereof, will best be understood by reference to the following description taken in connection with the accompanying drawings, and its scope will be pointed out in the appended claims.

In the drawings, in which like parts are designated by like reference numbers,

Fig. 1 is a cross sectional view of the welding portion of a machine embodying the present invention taken on the line 1—1 of Fig. 2;

Fig. 2 is a partial front elevational view of the portion of the machine shown in Fig. 1;

Fig. 3 is a perspective view of one type of grating made on the machine comprising the invention;

Fig. 4 is a partial top plan view of the grating of Fig. 3;

Fig. 5 is an exploded fragmentary view in perspective of components of the grating of Fig. 3 shown prior to their being welded on the present machine;

Figs. 6a–6b is a left-side elevational view of the feeding conveyor portion of the machine;

Fig. 7 is an enlarged left-side elevational view of the electrode sub-assembly comprising a part of the invention shown in Fig. 1;

Fig. 8 is an enlarged left-side elevational view of certain parts of the hold-down clamp beam assembly comprising a part of the invention shown in Fig. 1;

Fig. 9 is a cross sectional view taken on the line 9—9 in Fig. 8;

Fig. 10 is a partial front elevational view of parts of the electrode and hold-down portions of the machine;

Fig. 11 is an enlarged view of part of the hold-down assembly shown in Fig. 10;

Fig. 12 is a side elevational view of the parts of the machine shown in Fig. 11, and showing their relation to other parts of the machine;

Fig. 13 is a top plan view of the parts of the machine shown in Fig. 11;

Fig. 14 is a left-side elevational view of certain parts of the feeding mechanism assembly of the machine in forward bar gripping position;

Fig. 15 is a top plan view of the assembly shown in Fig. 14;

Fig. 16 is a rear elevational view taken in the direction of the arrows 16—16 in Fig. 14;

Fig. 17 is a detailed elevational view showing certain parts of the feeding mechanism assembly in rearward open position;

Fig. 18 is a top plan view of a portion of the transfer mechanism assembly of the machine;

Fig. 19 is a vertical cross sectional view taken on the line 19—19 of Fig. 18;

Fig. 20 is a vertical cross sectional view taken on the line 20—20 in Fig. 19;

Fig. 21 is a partial cross sectional view taken on the line 21—21 in Fig. 2;

Fig. 22 is a perspective schematic view showing certain operating parts of the machine in different positions;

Fig. 23 is a perspective schematic view showing those operating parts shown in Fig. 22 in other different positions; and Fig. 24 is a left-side elevational view of a switch mechanism employed in the welding electrical circuit.

Figure 123:
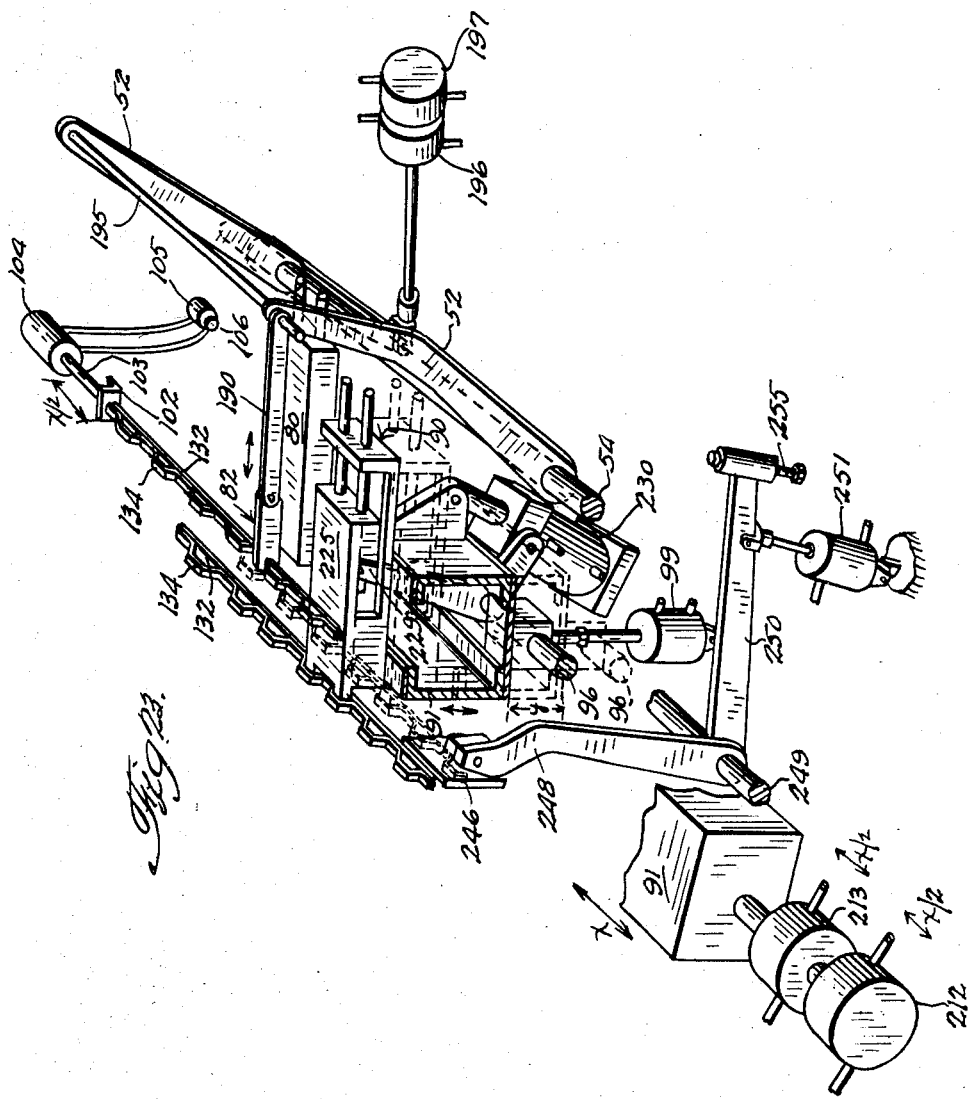

It is believed that the construction and operation of the machine of this invention can best be understood by first referring to Figs. 3, 4 and 5 which illustrate one form of welded grating structure 130 formed on the machine. The grating structure 130 comprises a plurality of elongated spaced-apart primary bars 132 secured in said spaced-apart relationship by means of generally zigzag-shaped secondary bars 134 which interconnect adjacent primary bars and are welded thereto at the raised portions 136 (Fig. 5), on spaced-apart welded contact portions 138 thereof to form a rigid grating structure. With reference to Fig. 4, it will be noted that the repeated pattern of the grating structure illustrated has a length $x$ which represents the center to center distance between adjacent welding contact portions 138 on the primary bar 132. The width of the repeated pattern of the grating 130 is represented by $y$.

To provide greater strength, the primary bars 132 are preferably I-shaped in cross section and the contact portions 138 of the secondary bars 134 are adapted to fit between the flanges of the adjacent primary bars. In the machine embodying the present invention disclosed in the drawings, certain parts thereof which come into contact with the primary and secondary bars during operation of the machine are specially shaped to embrace the primary and secondary bars of the type disclosed in Fig. 5.

Since a grating structure may be formed of generally similar primary and secondary bars which need not be exactly the same shape as those disclosed in the drawings, those parts of the machine which contact these bars may be slightly modified in shape, as will be pointed out hereinafter, so as to employ the machine of the invention to form a similar welded structure using somewhat differently shaped primary or secondary bars.

In accordance with the illustrated embodiment of the invention, there is provided, as shown in Figs. 1 and 2, a main frame 50 on which is mounted a plurality of transversely spaced-apart transformer and welding electrode assemblies 60, a clamping beam sub-assembly 70, a plurality of transversely spaced-apart feeding mechanism assemblies 80, a plurality of transversely spaced-apart transfer mechanism assemblies 90, a conveyor mechanism 100 for conveying and stacking unwelded bars to be fed into the machine of the invention, a retainer bar mechanism 110 and a discharge conveyor assembly 120 for rolling a finished welded grating structure from the machine.

As shown in Fig. 1 and Figs. 6a–6b, a conveyor 100 is provided at the forward end of the machine for transporting secondary bars 134 from a forming machine such as a punch press (not shown) to a lower storing rack 146 positioned proximate to the feeding mechanism 80 (Fig. 1). The primary bars 132 may be positioned for use either manually or by overhead crane (not shown) on the upper storing rack 148.

Secondary bars coming from the forming machine are deposited transversely on the forward end (right end of Fig. 6b) of the chain belt 140 which engages the pairs of sprocket wheels 214 and 215. A plurality of spaced-apart sets of fingers (not shown) on belt 140 engage the secondary bars to move them in the direction of the arrow until the bars are deposited on a second chain belt 142 having similar fingers which engages the pairs of sprocket wheels 215, 216, 217, 281 and 282, the wheel 216 being driven by a motor 273 by means of the connecting belt 274. Overriding chain belts 275 and 276, engaging wheels 277 and 278 and wheels 279 and 280, respectively, serve to keep the secondary bars flat as they are carried to and deposited on the lower storing rack 146.

Referring to Figs. 1, 2 and 7, the transformer and electrode assembly 60 comprises a sub-frame 62 supported on the main frame 50. A plurality of transversely spaced-apart transformers 64 are secured on the frame 62 by means of mounting brackets 283 and are each electrically connected to a plurality of transversely spaced-apart pairs of upper electrode assemblies 66 and lower electrode assemblies 68. The lower electrode assembly 68 (Fig. 7) comprises an electrode holder clamp 61 electrically connected and secured to the lower terminal of the transformer 64. The forward end of clamp 61 is electrically connected to the lower electrode holder 63 which is slidably supported in the clamp. A removable lower electrode 65 extends upwardly from the lower electrode holder 63. The upper electrode assembly 66 is electrically connected to the transformer 64 by means of a curved laminated plate 67 which extends between the upper transformer terminal and the upper electrode holder 69. Each upper electrode 150 is connected by means of an adapter member 152 to the upper electrode holder 69. Each upper electrode holder 69 is slidably clamped around a piston rod 154 depending from an air-operated double acting cylinder 158, the piston rod 154 being reciprocably operable within the upper electrode holder for raising and lowering the upper electrode 150 to bring the upper electrodes out of and into contact with bars to be welded which have been positioned over the lower electrodes as will be described hereinafter. The cylinder 158 is provided with conduits 159 and 160 through which air may be supplied to the cylinder 158.

It will be noted that the upper and lower electrode assemblies are cooled by means of self-contained water tube assemblies 284 to which cooling water is circulated through the connectors 161 and passageways 162. It should also be noted that an angle bar 286 is provided behind the electrodes to serve as a backstop for properly positioning the bars to be welded between the electrodes, as will be hereinafter described.

As shown in Figs. 2 and 10, a plurality of reciprocable hold-down assemblies 72 are spaced alternately between each welding assembly 60 for the purpose of maintaining the primary and secondary bars in proper alignment during welding. With particular reference to Figs. 2 and 8, the hold-down assemblies 72 are adjustably mounted at their upper ends on a transverse beam 73 which extends transversely across the entire width of the machine and is slidably mounted by means of brackets 74 which slidably engage a plurality of vertical bars 75 which are secured by brackets to the upright member 76 comprising part of the clamping assembly frame 70 which is secured on top of the transformer assembly frame 60. The upper flange of the beam 73 is secured to a plurality of vertical bars 77 which extend upward through a pair of gear housings 78 wherein the bars 77 engage gears 287 secured to the horizontal bar 79 which extends transversely across the entire width of the machine to connect the housings 78. By means of the handle 163 (Fig. 2) which rotates the gears provided on the bar 79 within each housing 78, the rods 77 and the attached beam 73 and hold-down assemblies 72 may be raised or lowered to provide for initial adjustment of the vertical position of the hold-down assemblies 72 which will depend upon the width y of the pattern of the grating structure to be welded and the stroke of the hold-down cylinder piston rods as will be hereinafter described.

As shown in Fig. 10, the hold-down assemblies 72 each comprise an air-operated double-acting cylinder 164 from the lower end of which depends a piston rod 165 reciprocably movable within and guided by a guide member 166 secured to the frame 62. By means of high pressure air introduced through the conduits 166 and controlled by valves (not shown), the rods 165 may be lowered and raised, as will be hereinafter explained.

As shown in Figs. 11 and 12, a plate 167 is secured to the lower end of each rod 165 and is provided with a pair of downwardly extending spaced-apart lugs 289 for receiving therebetween a contact portion 138 of the uppermost secondary bar 134 which has been inserted (as will be hereinafter described) into position for welding. As shown in Fig. 11, the primary bar 132a and the secondary bar 134a have previously been welded at the lower contact portion 138a and have been realigned in position for welding thereupon of the newly superimposed primary bar 132 and secondary bar 134 at the contact portions 138.

As will be hereinafter described, bars 132a and 134a and any additional bars previously welded therebeneath are supported in the position shown in Figs. 11 and 12 by the transfer assembly 90 which embraces the last previously welded bar 132a (as shown in Fig. 10). In the position for welding of newly added bars 132 and 134 (Fig. 10), the newly added primary bar 132 is supported on forwardly extending lower pins 168 and is positioned between the lower pins 168 and forwardly extending upper pins 169 which are secured to an upright part 170 of member 172. Member 172 is reciprocably mounted on the frame 171, as shown in Figs. 12 and 13, the upper flange 290 thereof being slidably mounted on an upright rod 173 secured to the bracket 174 attached to the frame 171. A spring 175 is provided on the rod 173 for biasing the upright member 170 upwardly. This mounting of the member 172 and attached pins 168 and 169 serves to absorb shock to prevent breaking of these pins when the piston rod 165 of each hold-down assembly 72 is lowered to clamp down on and straighten out any bows in the primary and secondary bars. When the piston rod 165 is lowered, the lugs 289 on plate 167 snugly embrace the contact portion 138 of the secondary bar 134 (Fig. 11) and force all the underlying bars together with member 172 downwardly until the lower end 291 of the upright portion of member 172 contacts the top of the flange 292 of bracket 174. In this position the bars are vertically aligned for welding.

As hereinbefore indicated, primary and secondary bars 132 and 134, respectively, are automatically fed into the position for welding as shown in Fig. 10 by means of a plurality of transversely spaced-apart feed mechanism assemblies 80, the details of which are best seen in Figs. 14 through 17. These assemblies 80 are supported on the fixed main frame 50 so that the respective clamping members 82 thereof are disposed in front of and in alignment with the welding electrodes as shown in Fig. 10. The feeding mechanisms 80 each have a frame 81 resiliently supported and attached at the front end thereof by a bendable strap 83 to the fixed frame 50. Frame 81 is slidably supported at the rear end thereof in a clevis support bracket 84 also attached (Fig. 16) to the fixed main frame 50. By means of a spring 85 encompassing a rod 86 supported vertically in the support bracket 84, the spring 85 being positioned between the lower portion of the support bracket and a guide member 87 depending from the bottom of the frame 81, frame 81 which slidably engages the support bracket 84 is normally biased upwardly by means of the spring 85.

Each feeding mechanism 80 is provided with a pair of parallel bars 88 horizontally supported on the resiliently mounted frame 81. A sliding member 89 is slidably mounted on bars 81 for reciprocating motion therealong. As shown in Fig. 16, a vertically extending aperture 177 is provided, in the lower end of which there is a friction slide 178 which rides on one of said bars 81 and is biased thereagainst by the spring 179 extending between said friction slide and an adjustable cap screw 180 which is provided to adjust the friction as desired.

As seen in Fig. 14, the clamping mechanism 82 comprises a pair of lower bar gripping fingers 181 fixed to the sliding member 89 at the rear end thereof. The sliding member 89 has two spaced-apart vertical side members 182 which contain opposed slots 183. A pair of bearing blocks 184 are positioned opposedly in said slots for reciprocal motion therein. A rear pivot pin 185 and a forward pivot pin 186 are horizontally and transversely supported between and by the opposed bearing blocks 184. An upper bar-gripping member 187, having a rearwardly extending bar engaging finger 188 and being of the general shape of a bell crank lever, is pivotally supported on pins 185 and 186 which extend through transversely extending holes provided in the lower portion 189 thereof. The forward hole 293 for receiving the pin 186 is made oversize to provide for vertical movement of the pin 186 therein, as will be hereinafter described.

As shown in Fig. 14, a connecting rod 190 is pivotally connected by means of a clevis 191 and pivot pin 192 to the upper part of the upper clamping member 187. A spring 193 is positioned between the clevis 191 and the lower part 189 of the upper clamping member so as to normally bias the bar gripping finger 188 away from the fixed lower finger 181, or, in other words, into open position. The rear end of the connecting rod 190 is pivotally connected by means of a clevis 194 and pivot pin 195 to the upper end of a lever arm 52, the latter being fixed at its lower end to the feed mechanism shaft 54 (Figs. 1 and 2).

As seen best in Figs. 1 and 2, the feed mechanism shaft 54, which extends transversely the entire width of the machine and which has a plurality of similar feed mechanism lever arms 52 rigidly attached thereto at spaced intervals, is mounted for rotation in journals 53 provided on the main frame uprights 56. The feed mechanism shaft 54 is driven by means of a downwardly extending lever arm 55 which is rigidly attached to the shaft 54 at its upper end and which is pivotally connected by means of a clevis 57 at its lower end to a piston rod 58 connected to a pair of double-acting air-operated cylinders 196 and 197 connected to reciprocate the rod 58 in two stages to cause a similar two-stage movement of the feed mechanism connecting rods 190 and clamping mechanisms 82. As shown in Fig. 1, the pivot pin 195 is actually a long rod which extends transversely and horizontally across the width of the entire machine and pivotally connects the lever arms 52 and connecting rods 190 of all feeding mechanisms to effect simultaneous action thereof. A supply of high pressure air for the feed mechanism operating cylinders 196 and 197 is remotely controlled.

When the piston rod 58 is at its extreme rear position (left, Fig. 1), the lever arm 52 will be in its extreme forward position in the direction of the arrow (Fig. 14). In this extreme forward position the connecting rod 190, sliding member 89 and clamping mechanism 82 of the feed mechanism assembly 80 will be in its extreme forward position, so that the upper bar gripping finger 188 and the lower bar gripping fingers 181 will be in substantially the position shown in Fig. 17. This is the position of the bar gripping fingers for manual positioning thereon of new bars.

In this position a primary bar 132 is first manually or mechanically positioned on the lower fingers 181 of each feeding mechanism. An adjustable horizontally disposed screw 198 (Figs. 15 and 17) is provided on the sliding member 89. A notch 199 is cut out of the head of the screw to provide a seat for aligning and positioning the primary load bar. An upwardly extending arm 100 (Fig. 17) is pivotally connected to the fixed frame 50 and is biased by means of the spring 101 to urge the primary bar 132 and a superimposed secondary bar 134 against the alignment screw 198.

Longitudinal alignment of the primary bar 132 and the secondary bar 134 (Fig. 23) is accomplished by abutting the right ends of these bars against the guide member 102. The guide member 102 is secured to the end of a piston rod 103 which is reciprocably operable in a double-acting air-operated cylinder 104. In the operation of the machine, the guide member 102 is alternately actuated to the right and left by means of a switch 105 which may be mounted on the fixed frame and which has a pivotally mounted cam follower 106 positioned in the path of movement of the feeding mechanism lever arm 52 at the right end of the machine so that each time this lever arm 52 pivots rearwardly and new bars are inserted between the electrodes, it strikes the follower 106 which actuates the switch 105 which in turn actuates the cylinder 104 so as to reposition the guide member 102 to the left or right, as the case may be, to the position for properly aligning the next primary and secondary bar to be inserted.

When the feed mechanism lever arms 52 move from their extreme right (forward) position to the left (Fig. 14), or rearwardly, in their first stage of movement controlled by cylinders 197, each connecting rod 190 moves to the left, causing the slide member 89 to also move to the left by reason of the movement of the blocks 184 from the extreme right end of the slots 183 to the extreme left end thereof whereat they push the sliding member to the left. As this movement to the left or rearwardly takes place, the upper and lower bar gripping fingers 188 and 181, respectively, move from their position shown in Fig. 17 to the position shown in Fig. 14, in which they tightly grip the primary bar 132 and the overlying secondary bar 134. This gripping is effected by reason of the location of the pivot pin 192 to the rear of the pivot pin 186 which permits the driving force of the connecting rod applied against the upper portion of the upper clamping member 187 to overcome the opposing force of the biasing spring 193. As this rearward movement takes place, the upper clamping member 187 pivots on the pin 185 and the pivot pin 186 rests in the bottom of the enlarged hole 184.

It should be noted that during the first stage of rearward movement, at the completion of which the bars are gripped, the sliding member 89 moves only part way from its extreme right or forward position. During the second stage of rearward movement of the connecting rod 190, by reason of actuation of the other feed mechanism driving cylinders 196, the sliding member 89 moves to the extreme left or rear position, shown in Fig. 14, in which position the bars have been fed all the way into their welding position. After the bars are positioned in the welding position, the connecting rod 190 may be returned to its extreme right or forward position by actuating both cylinders 196 and 197. In the course of this movement of the connecting rod 190 the sliding member 89 is returned to its extreme forward position and the biasing spring 193 causes reopening of the clamping mechanism 187, in which position the pivot pin 186 embraces the top of the oversize hole 185.

As indicated in Fig. 4, the contact portions 138 at which the secondary bars 134 are welded to an interposed primary bar 132, are not in vertical alignment with the contact portions at which adjacent primary bars are welded. Consequently means is provided to transfer and realign the already welded bars with respect to the welding electrodes which are fixed transversely. This transfer and realignment are effected by means of the transfer assembly 90 shown in Figs. 1 and 2 and in greater detail in Figs. 18, 19 and 20. The transfer assembly 90 comprises a frame 91 (Figs. 1 and 2) which is so mounted as to be movable both vertically with respect to the fixed frame 50 and horizontally in a direction transversely of the electrodes.

Transfer frame 91 is actually two spaced-apart frames (one for each side of the machine) rigidly secured by rods (not shown) in the middle of the machine so that the two sections operate as a unit. The left section is shown in Fig. 2. The entire frame 91 is supported at each end and in the space therebetween on mounting supports such as support 92 at the left side of the machine. Rotationally attached to supports 92 are a plurality of lever arms 93 which are similarly attached at the end remote from the frame 91 to upper shaft 94 supported on the main frame 50 and extending transversely of the machine. Brackets 95 (Fig. 2) depending from the transfer frame 91 have journaled therein a transfer mechanism shaft 96 also extending transversely and along which the brackets 95 are free to slide when a transverse motion is imparted to the frame member 91, as will be hereinafter described. The shaft 96 is supported in its lowermost position by a plurality of bearing brackets 97 (Figs. 2 and 21) which are open at the top and are secured to the main frame 50 at each end and at intervals along the shaft.

A plurality of lever arms 294 are journaled to the shaft 96 at spaced-apart intervals thereon. Lever arms 294 are also journaled to the lower shaft 98 (Fig. 1), supported on the main frame 50 and extending transversely thereof.

The movable frame 91 is caused to move up and down in a substantially vertical direction by means of a pair of double-acting air-operated lift cylinders 99, each of which is pivotally connected at its lower end to the main frame 50 by means of a clevis 201 and clevis pin 202. The upper end of each cylinder 99 is connected by a piston rod 203 to a journaled bracket 204 (Fig. 21) which engages the transfer mechanism shaft 96. The lift cylinders 99 which raise and lower the frame 91 may be remotely controlled by an operator or automatically actuated and are adjustable to provide a movement of the frame 91 between upper and lower positions equal to the distance y (Fig. 4) whereby already welded rods may be moved downwardly a distance y to provide for superimposing thereupon newly fed rods to be welded, as will hereinafter be described.

As shown in Figs. 1 and 2, in order to provide for manual vertical adjustment or positioning of the frame 91 without the aid of the lift cylinders 99, there is provided a cam shaft 206 extending transversely of the machine and supported by a plurality of journaled brackets 207 secured to the fixed main frame 50. A plurality of cams 208 are secured to the cam shaft 206 at spaced-apart intervals and are positioned below a plurality of cam followers 209 secured to the transfer mechanism shaft 96. By turning the cam shaft handle 210 (Fig. 2) attached to the left end of the cam shaft 206, the movable frame 91 which moves vertically with the transfer mechanism shaft 96 may be cammed upwardly or downwardly. By use of the cam, an operator of the machine may predetermine, for example, the extreme upper and lower positions of the left cylinder piston rods 203 which will depend upon the y dimension of the grating structure to be welded on the machine. After the desired adjustments have been made, the cam handle may be locked by means of the lock 211 and locking pin 296 (Fig. 2).

The horizontal transverse movement of the transfer mechanism frame 91 is accomplished by actuating two double-acting air-operated shift cylinders 212 and 213 (Fig. 2) which are attached to frame 91 for vertical movement therewith. The first stage cylinder 212 is rigidly attached to a mounting plate 298 rigidly connected by horizontally extending tie rods 218 to a cylinder mounting bracket 219 journaled on the support 92 and the shaft 96. Thus cylinder 212 is mounted in a fixed transverse position but may be raised or lowered with the movable frame 91.

The second stage cylinder 213 is fixed to a guide block 297 on the end of a shaft 220 which is an extension of the support 92. The outer end of the piston rod 221 of the first stage cylinder 212 is rigidly secured to the guide block 297 whereby movement of the piston rod 221 of the first stage cylinder 212 causes the second stage cylinder and guide block 297 to move back and forth transversely. Movement of the frame 91 to the right is effected by movement to the right of the guide block 297 which pushes the shaft 220 to the right. The right end of the piston rod 222 of the second stage cylinder 213 is rigidly attached to the frame 91 whereby movement of the piston rod 222 of the second stage cylinder causes the frame 91 to slide back and forth transversely along the transfer mechanism shaft 96.

It will thus be seen that a partial transverse movement of the frame 91 may be accomplished by utilizing either the first or second stage cylinder, or a complete transverse movement of the frame 91 may be accomplished by actuating both of said cylinders. The distance of horizontal travel of each of the piston rods 221 and 222 is conveniently designed to correspond to the distance $$\frac{x}{2}$$

as shown in Figs. 4 and 10. Thus the horizontal transverse movement of the frame 91 provides for ready alignment of the transfer assembly 90 and the bar gripping members thereof for realignment of welded bars, as will be hereinafter described.

With particular reference to Figs. 18, 19 and 20, the transfer assembly 90 also comprises a frame 223 rigidly attached to the top of the movable frame 91 for movement therewith. A pair of horizontal bars 224 are mounted on the frame 223 for supporting a sliding member 225 thereon. The sliding member 225 supports a pivot pin 226 on which is mounted a clevis 227 for pivotally connecting the slide member 225 by means of a pin 228 to the upper end of the lever arm 229. The lower end of the lever arm 229 is secured to the transfer mechanism shaft 96 for sliding engagement therewith when the transfer frame 91 is moved transversely as hereinbefore described. The lever arm 229, however, is keyed to shaft 96 so as to rotate therewith. Rotation of the shaft 96 is effected by means of a double-acting, air-operated cylinder 230 (Fig. 1) pivotally supported on a trunnion 231 keyed to shaft 96. The piston rod 232 extending generally upwardly from the cylinder 230 is pivotally connected at its upper end to a mounting bracket 233 secured to and extending forwardly from the movable frame 91. This manner of mounting the cylinder 230 provides for rotation of the shaft 96 when the piston rod 232 is reciprocated, and consequently, by reason of the lever arm 229, back-and-forth horizontal movement of the sliding member 225 of the transfer mechanism 90 is effected.

Referring to Figs. 18 and 19, at the rear end of the sliding member 225 there is provided an upper bar gripping member 234 having a pair of fingers 235 spaced apart by a recessed portion 236, the recess being sufficiently wide to permit fingers 235 to snugly straddle the contact portion 138 of the secondary bars, as shown in Fig. 10. The sliding member 225 is also provided with a bell crank member 237 pivotally supported thereon by means of a pin 238. The rearward part of the bell crank member 237 is provided with a pair of spaced-apart lower gripping fingers 239. The lower part of the bell crank lever 237 is pivotally connected by means of a pivot pin 240 and a clevis 241 to the outer end of a piston rod 242 operating within an air-operated cylinder 243 which has a spring 244 therein for normally biasing the lower fingers 239 downwardly to release the grip on the primary bar 132. By actuating the cylinder 243, the biasing effect of the spring 244 is overcome and the lower fingers 239 swing upwardly to firmly grip the primary bar 132.

It will be noted that a transversely extending straightening bar 299 is secured to each sliding member 225 by means of a pair of adjustable screws 300. Bars 299 serve to hold already welded bars in proper alignment when the retainer mechanism 110 is in the forward position, as will be hereinafter described.

It will thus be seen that by reason of the transfer mechanism 90 which has a three-dimensional movement as hereinbefore indicated, primary and secondary bars which have already been welded into a partially fabricated structure may be removed from the welding position and realigned by gripping the last-welded (uppermost) primary bar 132, by moving the sliding member 225 forwardly away from the electrodes, by lowering the movable frame 91 a distance *y*, by transversely moving the frame 91 to the left or right a distance $$\frac{x}{2}$$

and by moving the slidable frame 225 rearwardly to reposition the already-welded structure in proper alignment for having positioned thereupon by the feeding mechanism 80 a new primary and overlying secondary bar to be welded thereto.

As shown in Figs. 1 and 2, in order to retain the partially fabricated welded structure 130 in proper position against the back plate 245, a retainer mechanism 110 is provided. This retainer mechanism includes a retainer bar 246 which extends horizontally and transversely across the entire width of the machine. The retainer bar 246 is pivotally connected by means of pins 247 to a plurality of lever arms 248 which are keyed at their lower ends to a retainer shaft 249 which extends horizontally and transversely across the width of the machine and is supported in journal brackets on the fixed main frame 50. Another lever arm 250 is keyed to the retainer shaft 249 and extends forwardly therefrom, as shown in Fig. 1. A double-acting air-operated cylinder 251 is pivotally secured at its lower end to the fixed frame 250 and has an upwardly extending piston rod 252 pivotally connected by means of a clevis 253 and pivot pin 254 to arm 250. Actuation of the cylinder 251 effects rotation of the retainer shaft 249 to cause the retainer bar 246 to swing toward or away from the partially fabricated structure 130. By means of an adjusting screw 255 which bears against the frame member 256, the extreme rearward position of the retainer bar 246 may be adjusted to take into account the thickness of the grating structure being formed on the machine.

As shown in Fig. 1, there is provided a discharge conveyor mechanism 120 for assisting in the removal of the finished grating structure. This conveyor comprises a platform 257 having a plurality of spaced-apart rollers 258 mounted thereupon for rolling the finished grating out the side of the machine. By means of a jack screw mechanism 259, the discharge conveyor platform may be raised or lowered on a shaft 260 to provide for easy removal of finished grating structures of varying widths.

Special provision is made in the event special types of primary bars 132, for example, are wrongly positioned and inserted into the welding position. According to this feature of the invention shown in Fig. 24, a cut-out switch in effect is provided in the welding circuit. This switch may be mounted on a bracket 261 attached to the back side of and at some point along an upright angle member 262 which is secured to the frame member 171 with the forward surface thereof slightly rearwardly of the forward face of the backing plate 245. An electrical conducting rod 263 is horizontally disposed and slidably mounted in brackets 264 and 265 and is biased by means of a spring 266 away from a contact 267. Where special primary bars 132, for example, are used, one edge thereof may be coated with a non-conducting material, such as paint 268, so that when the bar is urged into the welding position in the direction of the arrow (Fig. 24), even though the rod 263, as usual, engages the contact 267 of a switch 269, electrical power to the electrodes is interrupted by the switch 269 by reason of the insulating material 268 which prevents the flow of current through the switch circuit.

Having thus described the construction, purpose and actuating means of the various mechanisms comprising one embodiment of this invention, it is believed further explanatory of the operation of the machine to describe a sequence of normal operation of all the mechanisms thereof. After the necessary adjustments are made which have hereinbefore been described as desirable, and prior to the feeding of any unwelded grating bars into the machine, the initial positioning of the various mechanism is as follows: The upper welding electrodes are positioned in the upper position as shown dotted in Fig. 10, the hold-down clamps are moved up (above the position shown in Fig. 10), the retainer bar is moved forwardly (as shown dotted in Fig. 1 and solid in Fig. 23), the feeder mechanism fingers are positioned fully out (forward) to the right of the position shown in Fig. 23, and as shown in Fig. 17. The transfer mechanism fingers are positioned approximately half way out (forward) and down (as shown dotted in Fig. 23 but unloaded with bars) and in their center transverse position.

Following the foregoing preferable initial setting or positioning of the various mechanisms, a primary bar 132 and an overlying secondary bar 134 are positioned on the feeder mechanisms, as shown in Fig. 17, with the transverse positioning bar guide 102 in the right position. The feeder fingers are then moved in (rearward) to their first stage position, as shown in Figs. 14 and 23. At this stage the feeder fingers have gripped the primary and overlying secondary bar as hereinbefore indicated. The feeder fingers are then moved through their second stage of movement to the position shown in Figs. 10 and 22. During this second stage movement of the feeder fingers, the right-hand lever arm 52 strikes the switch member 106, thereby causing the bar guide to move to the left as hereinbefore indicated to the position shown in Fig. 22.

The hold-down clamps are then brought down in rapid sequence in the order of their proximity to the center of the bars to be welded, as hereinbefore described, to the positions shown in Figs. 10 and 12. Substantially simultaneously the retainer bar is swung rearwardly into the position shown solid in Fig. 1 and dotted in Fig. 2. (At this stage the retainer bar does not bear aginst any previously welded bars as none have as yet been welded and lowered.) Next, the transfer fingers or clamps move up and into the position shown in Fig. 22 and to the upper center full line position illustrated in Fig. 10. In this position the transfer clamps in conjunction with the hold-down clamps securely hold the inserted primary and secondary bar in position for welding between the electrodes. Prior to welding, however, the feeder fingers are next moved fully forward and away from the electrodes, to the right of the position shown in Fig. 23, and to the position shown in Fig. 17.

The upper electrodes are thereafter brought down to the position shown solid in Fig. 10, the transfer clamps remaining as shown in the upper center full line position of Fig. 10. Next, the welding current is supplied through the electrodes and the first primary and secondary bars are welded at the spaced-apart contact portions 138. Immediately after welding, the upper electrodes are raised to the dotted positions of Fig. 10. As soon as these electrodes have been raised, the transfer fingers clamp on the welded primary and secondary bar as shown in Fig. 19, following which the hold-down clamps move up and the retainer bar swings out to the position shown solid in Fig. 22. Next the transfer clamps move out from the electrodes sufficiently to clear the supporting pins 168 and 169 to the position shown solid in Fig. 23. The transfer clamps then move down a distance y, to the left a distance $$\frac{x}{2}$$

and in again to the position shown dotted in Fig. 23 and in the lower left dotted position of Fig. 10. As a result of the foregoing movement of the transfer clamps, the previously welded primary and secondary bars have been moved out and away from the electrodes, down to the left, and back in the proper position for welding a new primary and secondary bar thereto.

Following the foregoing movement of the transfer clamps, the feeder mechanism is again loaded with a new primary and overlying secondary bar as shown in Fig. 17, the new bars being abutted against the guide bar 102 which, as previously indicated, is now in the left position. Next, the feeder fingers, with two new bars thereon, are moved in through their first- and second-stage movement as before to the position shown in Figs. 10 and 22. During the second-stage movement the feeder mechanism lever arm again strikes the switch member 106 which this time causes the guide bar to move back to its right-hand position.

Thereafter, the hold-down clamps come down and the retainer bar is moved in as before. The transfer clamps then move from their lower left dotted position of Fig. 10 outwardly from the electrodes as before, up the distance y, to the right the distance $$\frac{x}{2}$$

and in again to the position shown in Fig. 22 and to the upper center position of Fig. 10. Next, the feeder fingers move all the way back as before, and the upper electrodes come down, weld, and go back up as before. Next, the transfer fingers clamp as before (Fig. 19), the hold-down clamps go up, and the retainer bar comes out to the position shown solid in Fig. 22. Next, the transfer clamps move out as before, down the distance y, to the right the distance $$\frac{x}{2}$$

and in again to the lower right dotted position shown in Fig. 10. Next, the feeder fingers are loaded as before with the guide bar in the right-hand position. Then the feeder fingers again move in through both stages of their movement to the positions shown in Figs. 10 and 22 and the feeder mechanism lever arm again effects movement of the guide bar back to its left-hand position. Next, the hold-down clamps come down and the retainer bar swings in as before. Lastly, the transfer clamps move from the lower right position of Fig. 10 as before, up the distance y, to the left the distance $$\frac{x}{2}$$

and in again to return to the upper center position of Fig. 10, in which position of the various mechanisms of the invention one cycle of operation is completed. Additional primary and secondary bars may be similarly fed into the machine and welded to the already welded structure by repeating the just-described sequence of operation. By adding additional primary and secondary bars, a grating structure of any desired width may be fabricated on the machine of the invention.

It is to be understood that the various electrical switches and cylinders which are provided for movement of the various mechanisms of the invention may be controlled either separately and manually by an operator, or automatically in sequence by means of suitable valves, switches and timing devices (not shown) whereby a complete cycle of operation of the machine as hereinbefore described may be set in motion by the throwing of one switch following each manual positioning of new bars to be welded on the feeding mechanism. Also, although the various cylinders have been shown to be air powered, the invention is not to be limited thereto since hydraulic cylinders and other means of transmitting motion to the mechanisms of the invention are also contemplated within the scope of the invention.

While particular embodiments of the invention have been shown and described, it will be understood, of course, that the invention is not limited thereto, since many modifications may be made, and it is therefore contemplated to cover by the appended claims any such modifications as fall within the true spirit and scope of the invention.

The invention having been thus described, what is claimed and desired to be secured by Letters Patent is:

1. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes mounted on said frame, and means for feeding said primary and secondary bars into alignment with said electrodes for welding, said feeding means comprising a movable frame attached to said fixed frame, a reciprocating member on said movable frame for inserting said bars between said electrodes, clamping means on said reciprocating member for gripping said bars, and driving means for moving said reciprocating member and actuating said clamping means.

2. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes mounted on said frame, and means for feeding said primary and secondary bars into alignment with said electrodes for welding, said feeding means comprising a plurality of spaced-apart movable frames attached to said fixed frame, reciprocating members on said movable frames for inserting said bars between said electrodes, clamping means on said reciprocating members for gripping said bars at said contact portions, and driving means for moving said reciprocating members and actuating said clamping means.

3. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes mounted on said frame, and means for feeding said primary and secondary bars into alignment with said electrodes for welding, said feeding means comprising a plurality of spaced-apart movable frames mounted on said fixed frame, reciprocating members on said movable frames for inserting said bars between said electrodes, driving means for moving said reciprocating members and actuating said clamping means, means for retaining said bars in alignment with said electrodes after withdrawal of said feeding means, said retaining means comprising a plurality of spaced-apart vertically reciprocable clamping members adapted to embrace one of said bars at points intermediate of said electrodes, means for moving said retaining means into engagement with said bar, said movable frames being resiliently secured to said fixed frame at the ends thereof remote from said electrodes and being resiliently and slidably supported at the ends proximate to said electrodes whereby said frames may pivot downwardly and forwardly when said clamping members are lowered to engage one of said bars.

4. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes mounted on said frame, and means for feeding said primary and secondary bars into alignment with said electrodes for welding, said feeding means comprising a movable frame attached to said fixed frame, a reciprocating member on said movable frame for inserting said bars between said electrodes, clamping means on said reciprocating member for gripping said bars, said clamping means including a fixed finger, a pivotally supported finger, resilient means urging said pivotally supported finger away from said fixed finger to release said grip, and cam means for urging said pivotally supported finger into a bar gripping position, and driving means for moving said reciprocating member and actuating said clamping means.

5. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes mounted on said frame, and means for feeding said primary and secondary bars into alignment with said electrodes for welding, said feeding means comprising a movable frame attached to said fixed frame, a reciprocating member on said movable frame for inserting said bars between said electrodes, clamping means on said reciprocating member for gripping said bars, a first driving means for moving said reciprocating member sufficiently in the direction of said electrodes to cause said clamping means to grip said bars, and a second driving means to further move said reciprocating member to insert said bars between said electrodes.

6. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes mounted on said frame, longitudinally adjustable bar positioning guide means on said frame for positioning said bars with respect to said electrodes, and means for feeding said primary and secondary bars into alignment with said electrodes for welding, said feeding means comprising a movable frame attached to said fixed frame, a reciprocating member on said movable frame for inserting said bars between said electrodes, and driving means for moving said reciprocating member, actuating said clamping means, and repositioning said guide means for alignment of the next set of bars to be inserted.

7. A welding machine for forming a grating structure of the type having a plurality of longitudinally extending primary bars spaced apart by interconnecting secondary bars which abut adjacent primary bars at welded contact portions, comprising a frame, a plurality of longitudinally spaced-apart pairs of welding electrodes mounted on said frame, means for feeding said primary and secondary bars into alignment with said electrodes for welding, and means for retaining said bars in alignment with said electrodes during welding, said retaining means comprising a plurality of spaced-apart clamping members adapted to embrace one of said bars intermediate of the contact points thereof being welded, and means for raising and lowering said clamping members to permit said feeding and removal of said bars.

8. A welding machine for forming a grating structure of the type having a plurality of longitudinally extending primary bars spaced apart by interconnecting secondary bars which abut adjacent primary bars at welded contact portions, comprising a frame, a plurality of longitudinally spaced-apart pairs of welding electrodes mounted on said frame, means for feeding said primary and secondary bars into alignment with said electrodes for welding, and means for retaining said bars in alignment with said electrodes during welding, said retaining means comprising a plurality of spaced-apart clamping mechanisms adapted to embrace said bars intermediate of the contact points thereof being welded, each of said clamping mechanisms comprising a vertically reciprocable member adapted to embrace a contact portion of one of said bars, and a lower vertically reciprocable member adapted to embrace an adjacent bar, and means for raising and lowering said clamping members.

9. The welding machine of claim 8 wherein said lower vertically reciprocable member is spring biased upwardly and movable downwardly against its bias when said upper reciprocable member is lowered to bar embracing position.

10. A welding machine for forming a grating structure of the type having a plurality of longitudinally extending primary bars spaced apart by interconnecting secondary bars which abut adjacent primary bars at welded contact portions, comprising a frame, a plurality of longitudinally spaced-apart pairs of welding electrodes mounted on said frame, means for feeding said primary and secondary bars into alignment with said electrodes for welding, and means for retaining said bars in alignment with said electrodes during welding, said retaining means comprising a plurality of longitudinally spaced-apart clamping members adapted to embrace said bars intermediate of the contact points thereof being welded, means for raising and lowering said clamping members, and timing control means actuating said lowering means whereby said clamping means are caused to embrace said bars in the order of their proximity to the mid-lengths thereof.

11. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes mounted on said frame, means for feeding said primary and secondary bars into alignment with said electrodes for welding, and means for retaining said bars in alignment with said electrodes during welding, said retaining means comprisnng a vertically movable frame slidably mounted on said fixed frame, a plurality of spaced-apart clamping mechanisms secured to said movable frame and depending therefrom, said clamping mechanisms comprising vertically reciprocable clamping members adapted to embrace one of said bars intermediate of the contact portions thereof in position for welding, and means for lowering said clamping members to cause said embracement.

12. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes mounted on said frame, means for feeding said primary and secondary bars into alignment with said electrodes for welding, and means for retaining said bars in alignment with said electrodes during welding, said retaining means comprising a vertically movable frame slidably mounted on said fixed frame, a plurality of spaced-apart clamping mechanisms secured to said movable frame and depending therefrom, said clamping mechanisms comprising vertically reciprocable clamping members adapted to embrace one of said bars intermediate of the contact portions thereof in position for welding, means for lowering said clamping members to cause said embracement, and means for adjusting the height of said movable frame with respect to said fixed frame.

13. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes mounted on said frame, means for feeding said primary and secondary bars into alignment with said electrodes for welding, and means for realigning welded bars with respect to said electrodes for welding additional primary and secondary bars thereto, said realigning means comprising a second frame movable vertically with respect to said fixed frame, a reciprocating member mounted on said movable frame for transporting welded bars horizontally and perpendicularly with respect to said electrodes, and driving means for moving said second frame and said reciprocating member.

14. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes mounted on said frame, means for feeding said primary and secondary bars into alignment with said electrodes for welding, and means for realigning welded bars with respect to said electrodes for welding additional primary and secondary bars thereto, said realigning means comprising a second frame movable vertically with respect to said fixed frame, a reciprocating member mounted on said movable frame for transporting welded bars horizontally and perpendicularly with respect to said electrodes, clamping means on said reciprocating member for gripping said welded bars, driving means for moving said second frame and said reciprocating member, and means for actuating said clamping means.

15. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes mounted on said frame, means for feeding said primary and secondary bars into alignment with said electrodes for welding, and means for realigning welded bars with respect to said electrodes for welding additional primary and secondary bars thereto, said realigning means comprising a second frame movable vertically and longitudinally with respect to said fixed frame, a reciprocating member mounted on said movable frame and movable perpendicularly and horizontally with respect to said electrodes, driving means for moving said reciprocating member, means for raising and lowering said second frame, and means for moving said second frame longitudinally.

16. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes mounted on said frame, means for feeding said primary and secondary bars into alignment with said electrodes for welding, and means for realigning welded bars with respect to said electrodes for welding additional primary and secondary bars thereto, said realigning means comprising a second frame movable vertically and longitudinally with respect to said fixed frame, a reciprocating member mounted on said movable frame and movable perpendicularly and horizontally with respect to said electrodes, clamping means on said reciprocating member for gripping said welded bars, driving means for moving said reciprocating member, means for actuating said clamping means, lifting means for raising and lowering said second frame, and means for moving said second frame horizontally.

17. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes mounted on said frame, means for feeding said primary and secondary bars into alignment with said electrodes for welding, and means for realigning welded bars with respect to said electrodes for welding additional primary and secondary bars thereto, said realigning means comprising a movable frame mounted on said fixed frame, a reciprocating member mounted on said movable frame for repositioning said welded bars with respect to said electrodes, clamping means on said reciprocating member for gripping said welded bars, said clamping means comprising an upper finger rigidly secured to said reciprocating member and a pair of spaced-apart lower fingers pivotally secured to said reciprocating member, driving means for moving said reciprocating member, and means for urging said lower fingers into bar gripping engagement with said upper finger.

18. The welding machine of claim 17 wherein said upper finger of said clamping means is provided with a centrally located recess to permit said finger to embrace a contact portion of a secondary bar.

19. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes reciprocably supported on said fixed frame, means for reciprocating the upper members of said pairs of electrodes, reciprocating means on said fixed frame for feeding said primary and secondary bars into alignment with said electrodes for welding, driving means for reciprocating said feeding means, retaining means reciprocably supported on said fixed frame for retaining said bars in alignment with said electrodes during welding, driving means on said fixed frame for reciprocating said retaining means, a movable frame supported on said fixed frame for vertical and horizontal movement with respect to said fixed frame, means including said movable frame and bar gripping members thereon for realigning welded bars with respect to said electrodes for welding additional primary and secondary bars thereto, and driving means for moving said realigning means.

20. A welding machine for forming a grating structure of the type having a plurality of longitudinally extending primary bars spaced apart by interconnecting secondary bars which abut adjacent primary bars at welded contact portions, comprising a fixed frame, a plurality of longitudinally spaced-apart pairs of welding electrodes reciprocably supported on said fixed frame, means for reciprocating the upper members of said pairs of electrodes, reciprocating means on said fixed frame for feeding said primary and secondary bars into alignment with said electrodes for welding, driving means for reciprocating said feeding means, retaining means reciprocably supported on said fixed frame for retaining said bars in alignment with said electrodes during welding, driving means on said fixed frame for reciprocating said retaining means, a movable frame supported on said fixed frame for vertical and horizontal movement with respect to said fixed frame, means including said movable frame and bar gripping members thereon for realigning welded bars with respect to said electrodes for welding additional primary and secondary bars thereto, and driving means for moving said realigning means, said last-mentioned driving means comprising a first pressure actuated cylinder means connected between said fixed frame and said movable frame for raising and lowering said movable frame, a second pressure actuated cylinder connected between said fixed frame and said movable frame for reciprocating said movable frame in a path parallel to the plane of said electrodes, and a third pressure actuated cylinder pivotally supported on said movable frame for reciprocating said bar gripping members in paths perpendicular to the plane of said electrodes.

21. A welding machine for forming a grating structure of the type comprising a plurality of spaced longitudinally extending primary bars and a plurality of generally zigzag shaped secondary bars having a plurality of spaced-apart contact portions abutting adjacent primary bars and disposed in spaced-apart aligned rows, the contact portions in one row being offset longitudinally from the contact portions in the adjacent row, comprising a plurality of longitudinally spaced-apart pairs of welding electrodes, means for inserting a primary bar and an abutting secondary bar between said electrodes for welding said bars at the contact portions of one row of said secondary bar, and means for withdrawing said bars from between said electrodes after welding and for moving said welded bars longitudinally and transversely with respect to said welded bars and for reinserting said welded bars between said electrodes with the unwelded contact portions of said secondary bar in alignment with said electrodes for welding additional bars thereto.

22. A welding machine for forming a grating structure of the type comprising a plurality of spaced longitudinally extending primary bars and a plurality of generally zigzag shaped secondary bars having a plurality of spaced-apart contact portions abutting adjacent primary bars and disposed in spaced-apart aligned rows, the contact portions in one row being offset longitudinally from the contact portions in the adjacent row, comprising a plurality of longitudinally spaced-apart pairs of welding electrodes, means for reciprocating one member of each pair of said electrodes to permit insertion of said primary and secondary bars between said pairs for welding, means for inserting a primary bar and an abutting secondary bar between said electrodes for welding said bars at the contact portions of one row of said secondary bar, and means for withdrawing said bars from between said electrodes after welding and for moving said welded bars longitudinally and transversely with respect to said welded bars and for reinserting said welded bars between said electrodes with the unwelded contact portions of said secondary bar in alignment with said electrodes for welding additional bars thereto.

23. A welding machine for forming a grating structure of the type comprising a plurality of spaced longitudinally extending primary bars and a plurality of generally zigzag shaped secondary bars having a plurality of spaced-apart contact portions abutting adjacent primary bars and disposed in spaced-apart aligned rows, the contact portions in one row being offset longitudinally from the contact portions in the adjacent row, comprising a plurality of longitudinally spaced-apart pairs of welding electrodes, means for inserting a primary bar and an abutting secondary bar between said electrodes for welding said bars at the contact portions of one row of said secondary bar, means for retaining said bars in alignment with said electrodes during welding, and means for withdrawing said bars from between said electrodes after welding and for moving said welded bars longitudinally and transversely with respect to said welded bars and for reinserting said welded bars between said electrodes with the unwelded contact portions of said secondary bar in alignment with said electrodes for welding additional bars thereto.

24. A welding machine for forming a grating structure of the type comprising a plurality of spaced longitudinally extending primary bars and a plurality of generally zigzag shaped secondary bars having a plurality of spaced-apart contact portions abutting adjacent primary bars and disposed in spaced-apart aligned rows, the contact portions in one row being offset longitudinally from the contact portions in the adjacent row, comprising a plurality of longitudinally spaced-apart pairs of welding electrodes, means for inserting a primary bar and an abutting secondary bar between said electrodes for welding said bars at the contact portions of one row of said secondary bar, means for withdrawing said bars from between said electrodes after welding and for moving said welded bars longitudinally and transversely with respect to said welded bars and for reinserting said welded bars between said electrodes with the unwelded contact portions of said secondary bar in alignment with said electrodes for welding additional bars thereto, and means for interrupting the source of electric power for said electrodes to prevent the welding of improperly inserted bars.

25. The method of forming a grating structure comprising a plurality of spaced longitudinally extending primary bars and a plurality of generally zigzag shaped secondary bars having a plurality of spaced-apart contact portions abutting adjacent primary bars and disposed in spaced-apart aligned rows, the contact portions in one row being offset longitudinally from the contact portions in the adjacent row, which comprises interposing a first primary bar between a first pair of secondary bars with the contact portions of one row of one of said first pair in alignment with the contact portions of one row of the other of said pair, simultaneously welding said first primary bar and said first pair of secondary bars at each of said firstly aligned contact portions, interposing a second primary bar between a third secondary bar and one member of said first pair of secondary bars with the contact portions of one row of said third secondary bar in alignment with the unwelded contact portions of said one member of said first pair of secondary bars, and simultaneously welding said second primary bar and said one member of said first pair of secondary bars at each of said secondly aligned contact portions.

26. The method of forming a grating structure comprising a plurality of spaced longitudinally extending primary bars and a plurality of generally zigzag shaped secondary bars having a plurality of spaced-apart contact portions abutting adjacent primary bars and disposed in spaced-apart aligned rows, the contact portions in one row being offset longitudinally from the contact portions in the adjacent row, which comprises interposing a first primary bar between a first pair of secondary bars with the contact portions of one row of one of said first pair in alignment with both the contact portions of one row of the other of said pair and with a plurality of equally spaced-apart welding electrodes, simultaneously welding said first primary bar and said first pair of secondary bars at each of said firstly aligned contact portions, aligning the unwelded contact portions of one member of said first pair of secondary bars with said electrodes, interposing a second primary bar between a third secondary bar and said one member of said first pair of secondary bars with the contact portions of one row of said third secondary bar in alignment with the unwelded contact portions of said one member of said first pair of secondary bars, and simultaneously welding said second primary bar and said one member of said first pair of secondary bars at each of said secondly aligned contact portions.

27. The method of forming a grating structure comprising a plurality of spaced longitudinally extending primary bars and a plurality of generally zigzag shaped secondary bars having a plurality of spaced-apart contact portions abutting adjacent primary bars and disposed in spaced-apart aligned rows, the contact portions in one row being offset longitudinally from the contact portions in the adjacent row, which comprises simultaneously welding a first primary bar and an abutting first secondary bar at each contact portion where said bars abut, positioning a second primary bar and an abutting second secondary bar over said first secondary bar with the abutting contact portions of said second secondary bar in alignment with the unwelded contact portions of said first secondary bar and spaced therefrom by said second primary bar, and simultaneously welding said second primary bar and said first and second secondary bars at each of said secondly aligned contact portions.

28. The method of forming a grating structure comprising a plurality of spaced longitudinally extending primary bars and a plurality of generally zigzag shaped secondary bars having a plurality of spaced-apart contact portions abutting adjacent primary bars and disposed in spaced-apart aligned rows, the contact portions in one row being offset longitudinally from the contact portions in the adjacent row which comprises positioning a first primary bar and an abutting first secondary bar so that the abutting contact portions of said secondary bar are in alignment with equally spaced-apart welding electrodes, simultaneously welding said first primary bar and said first secondary bar at each of said abutting contact portions, positioning a second primary bar and an abutting second secondary bar over said first secondary bar with the abutting contact portions of said second secondary bar in alignment with said welding electrodes and with the unwelded contact portions of said first secondary bar and spaced from said first secondary bar by said second primary bar, and simultaneously welding said second primary bar and said first and second secondary bars at each of said secondly aligned contact portions.

29. The method of forming a grating structure comprising a plurality of spaced longitudinally extending primary bars and a plurality of generally zigzag shaped secondary bars having a plurality of spaced-apart contact portions abutting adjacent primary bars and disposed in spaced-apart aligned rows, the contact portions in one row being offset longitudinally from the contact portions in the adjacent row, which comprises inserting a first primary bar and an overlying and abutting first secondary bar between a plurality of spaced-apart pairs of welding electrodes with the abutting contact portions of said secondary bar in alignment with said electrodes, simultaneously welding said first primary bar and said first secondary bar at each of said abutting contact portions, withdrawing said first primary bar and said first secondary bar from between said electrodes and reinserting said first primary bar and said first secondary bar between said electrodes with the unwelded contact portions of said first secondary bar in alignment therewith, superimposing thereupon a second primary bar and an overlying and abutting second secondary bar with the abutting contact portions of said secondary bar in alignment with the unwelded contact portions of said first secondary bar, and simultaneously welding said second primary bar and said first and second secondary bars at each of said secondly aligned contact portions.

30. A welding machine for forming a grating structure of the type comprising a plurality of spaced longitudinally extending primary bars and a plurality of generally zigzag shaped secondary bars having a plurality of spaced-apart contact portions abutting adjacent primary bars and disposed in spaced-apart aligned rows, the contact portions in one row being offset longitudinally from the contact portions in the adjacent row, comprising a plurality of longitudinally spaced-apart pairs of welding electrodes, means for inserting a primary bar and an abutting secondary bar between said electrodes for welding said bars at the contact portions of one row of said secondary bar, and means for effecting relative movement between said electrodes and said welded bars whereby the most recently welded contact portions are removed from between said electrodes and transposed so as to bring the unwelded contact portions of the other row of said secondary bar into alignment with said electrodes for welding an additional primary and secondary bar thereto.

References Cited in the file of this patent

UNITED STATES PATENTS

| | | |
|---|---|---|
| 1,869,804 | Eksergian | Aug. 2, 1932 |
| 2,033,851 | Roth | Mar. 10, 1936 |
| 2,236,823 | Hughes | Apr. 1, 1941 |
| 2,482,023 | Optiz | Sept. 13, 1949 |
| 2,529,556 | Keller | Nov. 14, 1950 |